US011993186B2

(12) United States Patent
Liu (10) Patent No.: US 11,993,186 B2
(45) Date of Patent: May 28, 2024

(54) SIDE WING ADJUSTMENT MECHANISM AND ADJUSTABLE SITTING DEVICE (71) Applicant: BAMBINO PREZIOSO SWITZERLAND AG, Steinhausen (CH)

(72) Inventor: Zujian Liu, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 0 days.

(21) Appl. No.: 18/328,191

(22) Filed: Jun. 2, 2023

(65) Prior Publication Data

US 2023/0302982 A1 Sep. 28, 2023

Related U.S. Application Data (63) Continuation of application No. 17/699,365, filed on Mar. 21, 2022, now Pat. No. 11,731,545.

(30) Foreign Application Priority Data

Mar. 23, 2021 (CN) .......................... 202110308257.3

(51) Int. Cl.
*B60N 2/26* (2006.01)
*B60N 2/28* (2006.01)
*B60N 2/885* (2018.01)

(52) U.S. Cl.
CPC .......... *B60N 2/885* (2018.02); *B60N 2/2851* (2013.01)

(58) Field of Classification Search
CPC ................................ B60N 2/2851; B60N 2/26
See application file for complete search history.

(56) References Cited

U.S. PATENT DOCUMENTS 10,807,506 B2 * 10/2020 Denbo ................. B60N 2/2851
10,843,605 B2 * 11/2020 Johnson ............... B60N 2/2851
(Continued)

FOREIGN PATENT DOCUMENTS

CN        2851008 Y     12/2006
CN     201566523 U      9/2010
(Continued)

OTHER PUBLICATIONS

German 1st Office Action issued in corresponding German Application No. 102022106866.8, dated Jun. 15, 2023, pp. 1-5.
(Continued)

*Primary Examiner* — Shin H Kim
(74) *Attorney, Agent, or Firm* — HAUPTMAN HAM, LLP (57) ABSTRACT A side wing adjustment mechanism and an adjustable sitting device, the side wing adjustment mechanism includes: a pin arranged on the headrest; and an inclined grooves arranged on the side wing, a distance between a portion of the inclined grooves and the longitudinal center axis gradually decreases in a direction extending from bottom to top toward the headrest along a longitudinal center axis of the backrest, and the pin is slidable along the inclined grooves. According to the application, the side wing can be folded and opened at will, and the structure of the application is more inclusive. During the opening and folding process, puling of the headrest or pushing of the side wing can be performed more smoothly and labor-savingly, and the phenomenon of deflection and jamming can be avoided, such that the opening and folding process of the side wings is smoother.

17 Claims, 5 Drawing Sheets

(56) References Cited

U.S. PATENT DOCUMENTS

| | | | |
|---|---|---|---|
| 10,940,778 B2* | 3/2021 | Fu | B60N 2/2851 |
| 2009/0212613 A1* | 8/2009 | Freeman | B60N 2/2851 |
| | | | 297/250.1 |
| 2010/0264705 A1* | 10/2010 | Karremans | B60N 2/2851 |
| | | | 297/250.1 |
| 2012/0153690 A1* | 6/2012 | Gaudreau, Jr. | B60N 2/2821 |
| | | | 297/464 |
| 2012/0181829 A1* | 7/2012 | Williams | B60N 2/2806 |
| | | | 297/250.1 |
| 2012/0313413 A1* | 12/2012 | Hutchinson | B60N 2/2851 |
| | | | 297/250.1 |
| 2013/0175835 A1* | 7/2013 | Fujita | B60N 2/2812 |
| | | | 297/219.12 |
| 2016/0114706 A1* | 4/2016 | Hutchinson | B60N 2/2863 |
| | | | 297/256.13 |
| 2020/0223333 A1* | 7/2020 | Mason | B60N 2/2875 |
| 2020/0398711 A1* | 12/2020 | Fu | B60N 2/824 |
| 2021/0061150 A1* | 3/2021 | Mo | A47C 7/38 |
| 2021/0094448 A1* | 4/2021 | Zhao | B60N 2/26 |
| 2021/0380028 A1* | 12/2021 | Mo | A47C 7/38 |
| 2022/0305973 A1* | 9/2022 | Liu | B60N 2/885 |

FOREIGN PATENT DOCUMENTS

| | | |
|---|---|---|
| CN | 203567585 U | 4/2014 |
| CN | 204821212 U | 12/2015 |
| CN | 205010033 U | 2/2016 |
| CN | 205387081 U | 7/2016 |
| CN | 205395835 U | 7/2016 |
| CN | 107199925 A | 9/2017 |
| CN | 206664355 U | 11/2017 |
| CN | 107791905 A | 3/2018 |
| CN | 207697551 U | 8/2018 |
| CN | 208978675 U | 6/2019 |
| CN | 110077296 A | 8/2019 |
| CN | 209987783 U | 1/2020 |
| CN | 211684778 U | 10/2020 |
| CN | 211684779 U | 10/2020 |
| CN | 211765088 U | 10/2020 |
| CN | 112428895 A | 3/2021 |
| CN | 212667183 U | 3/2021 |
| CN | 213676453 U | 7/2021 |
| DE | 102014100380 A1 | 7/2014 |
| DE | 102017119698 B4 | 9/2020 |
| TW | 200613164 | 5/2006 |
| TW | 200916350 | 4/2009 |
| TW | I348428 | 9/2011 |

OTHER PUBLICATIONS

Chinese Search Report issued in corresponding Chinese Application No. 202110308257.3, dated Mar. 23, 2021, pp. 1-16.

Taiwanese 1st Office Action issued in corresponding Taiwanese Patent No. 111110361, dated May 22, 2023, pp. 1-7.

* cited by examiner

SIDE WING ADJUSTMENT MECHANISM AND ADJUSTABLE SITTING DEVICE

PRIORITY CLAIM

The present application is a continuation of U.S. application Ser. No. 17/699,365, filed Mar. 21, 2022, which claims the priority of China Application No. 202110308257.3, filed Mar. 23, 2021, which are incorporated herein by reference in their entireties.

TECHNICAL FILED

The present application relates to a side wing adjustment mechanism and an adjustable sitting device including the side wing adjustment mechanism.

BACKGROUND

A child safety seat is a device specially designed for children of different weights or ages. Children will be restrained in the safety seats during travelling, so in the case of a car collision or sudden deceleration, the impact on them can be reduced and their bodies can be restricted, thereby effectively improving safety of children while travelling.

The main structure of the child safety seat generally includes a headrest supporting the child's head, a backrest supporting the child's back, and a seat part. Generally, the headrest can slide up and down relative to the backrest, so as to meet requirements of different sized children. In addition, with the requirements of the market and technological innovations, and also for sake of reducing the impact on children in the event of a traffic accident and improving the safety and comfort of child safety seats, more and more child safety seats have begun to arrange side wings on both sides of the backrest, so as to form a safer and more comfortable enclosed space.

SUMMARY

According to an aspect of the application, a side wing adjustment mechanism for adjusting a height of a headrest respective to a backrest and an extension distance of side wings is provided. The side wing adjustment mechanism includes: a pin arranged on the headrest; and an inclined groove arranged on the side wings, a distance between a portion of each of the inclined grooves and a longitudinal center axis of the backrest gradually decreases in a direction extending from bottom to top toward the headrest along the longitudinal center axis, and the pin is slidable along the inclined grooves.

According to another aspect of the application, an adjustable sitting device is provided. The adjustable sitting device includes: a headrest; a backrest slidably arranged on the backrest; a side wing connected to the backrest; and the side wing adjustment mechanism is as defined above.

In the side wing adjustment mechanism and the adjustable sitting device including the side wing adjustment mechanism according to the application, the side wings can be folded and opened at will through the side wing adjustment mechanism, and the structure of the application is more inclusive. During the opening and folding process of the side wings, puling of the headrest or pushing of the side wings can be performed more smoothly and labor-savingly, and the phenomenon of deflection and jamming of the side wings during the opening and folding process can be avoided, such that the opening and folding process of the side wings is smoother.

BRIEF DESCRIPTION OF THE DRAWINGS

The accompanying drawings are included herein to provide a further understanding of the disclosure, and are incorporated into this specification to constitute a part of this specification. The accompanying drawings illustrate embodiments of the disclosure, and are used together with the following description to illustrate the concept of the disclosure.

In the drawings.

DETAILED DESCRIPTION

Hereinafter, example embodiments will be described in detail with reference to the accompanying drawings. Although the disclosure is susceptible to various modifications and alternatives, specific embodiments thereof are shown by way of example in the accompanying drawings. However, the disclosure should not be construed as being limited to the embodiments set forth herein, but on the contrary, the disclosure will cover all modifications, equivalents, and alternatives that fall within the spirit and scope of the embodiments.

The side wings in the related art are usually fixed and cannot be adjusted with the adjustment of the height of the headrest, so there is a problem that for children of different ages and sizes, the fixed side wings cannot provide more fit comfort, and also reduce safety accordingly. In addition, when the child safety seat is temporarily unused and needs to be stored, or when the child safety seat is transported, the side wings extended outwardly cause the child safety seat to occupy more space, thusly causing inconvenience. Furthermore, the side wings also need to be folded when the child safety seat is tested before it leaves the factory, so it is extremely necessary to improve the child safety seat in the related art, in which side wings cannot be folded and opened at will.

In view of the above problems, a purpose of the application is to provide a side wing adjustment mechanism and an adjustable sitting device including the side wing adjustment mechanism, wherein the side wings can be folded and opened at will by the side wing adjustment mechanism, so as to meet the requirements for safety, comfort and/or test of the adjustable sitting device.

The following detailed description of the application is mainly carried out by referring to a child safety seat, however, the side wing adjustment mechanism according to the application can also be applied to other occasions, such as various child strollers, child dining chairs, or the like. The side wing adjustment mechanism according to at least one embodiment of the application can adjust the width of the side wings and avoid the phenomenon of deflection and jamming occurring during the adjustment of the side wings.

A side wing adjustment mechanism and an adjustable sitting device according to the application will be described in detail as below with reference to the accompanying drawings, and in the following embodiments, the adjustable sitting device is illustrated by taking a child safety seat as example, however, the structure is also applicable to other sitting devices, such as sofas, seat cushions, office chairs, or the like.

Figure 1:
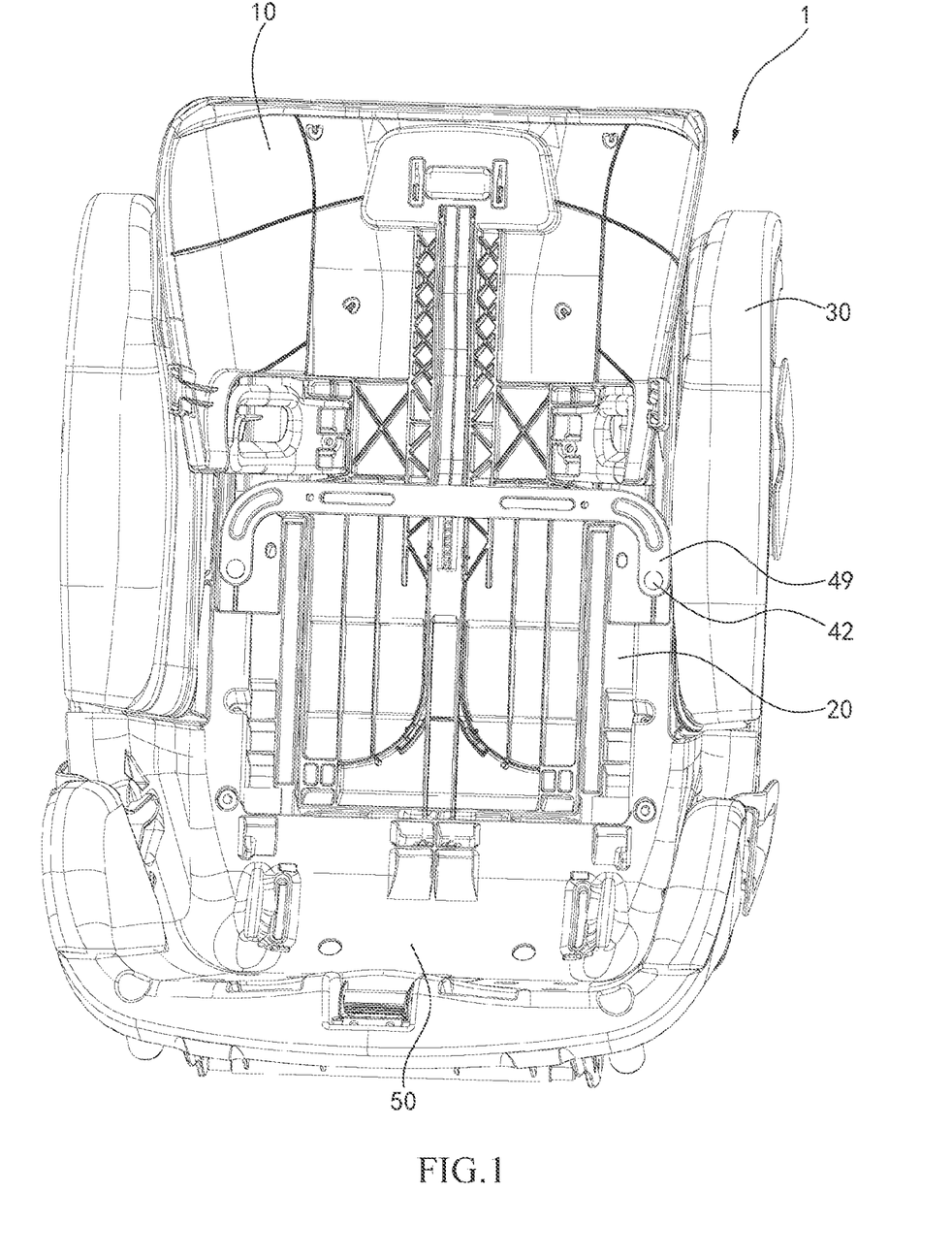
FIG. 1 is a schematic view showing a front side of a structure of a child safety seat according to the application.

FIG. 1 is a schematic view showing a front side of a structure of a child safety seat according to the application. The child safety seat 1 includes a headrest 10 and a backrest 20, and the headrest 10 is slidably arranged on the backrest 20. In addition, side wings 30 are connected to both sides of the backrest 20. A lower end of backrest 20 is connected to a seat part 50. The headrest 10, the backrest 20, the seat part 50, and the side wings 30 on both sides form a space for the user to sit, so as to provide the safety and comfort for the user to sit in while travelling.

Figure 2:
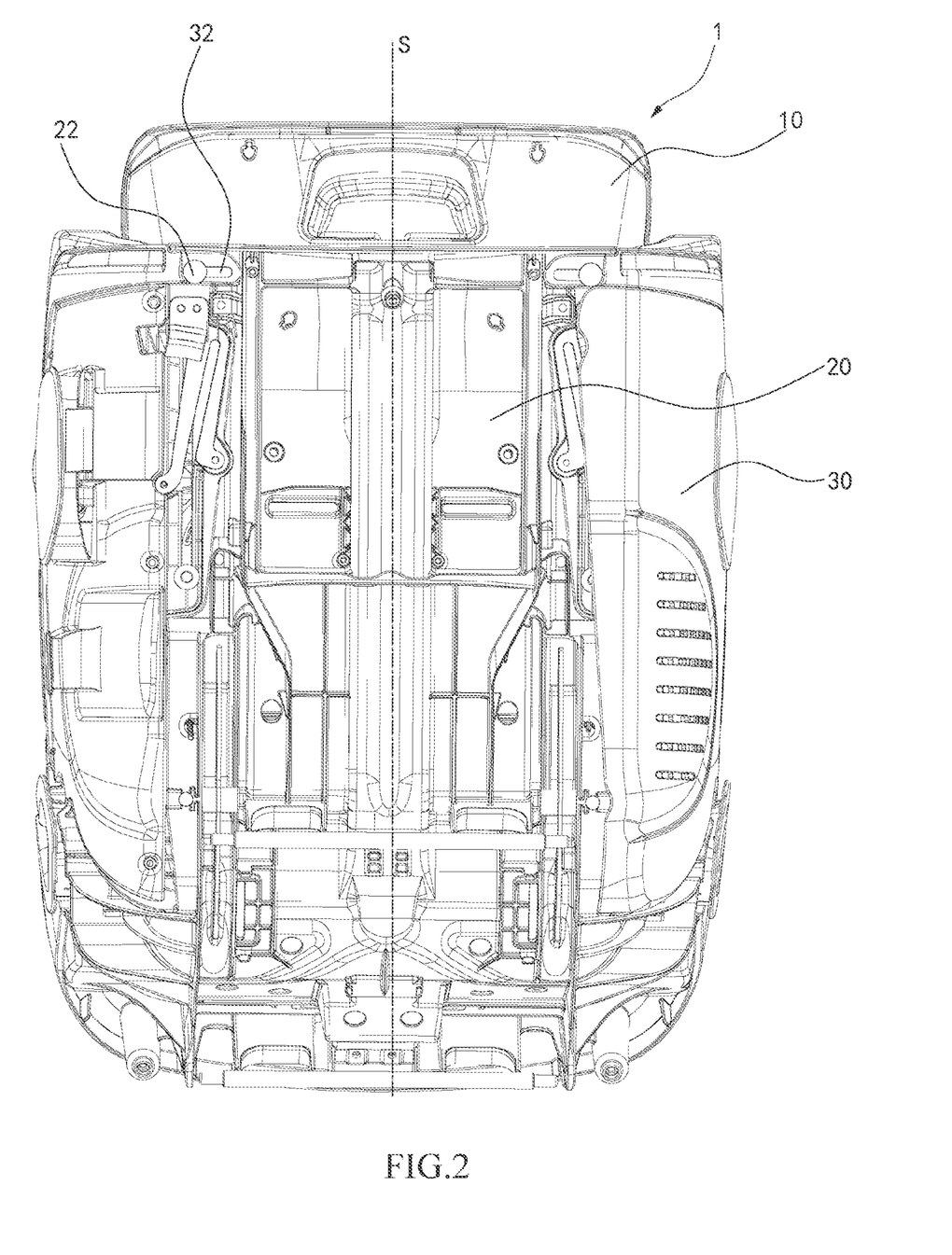
FIG. 2 is a schematic view showing a rear side of the structure of the child safety seat according to the application, wherein a headrest is in a non-raised state, and side wings are in an un-extended state.
Figure 3:
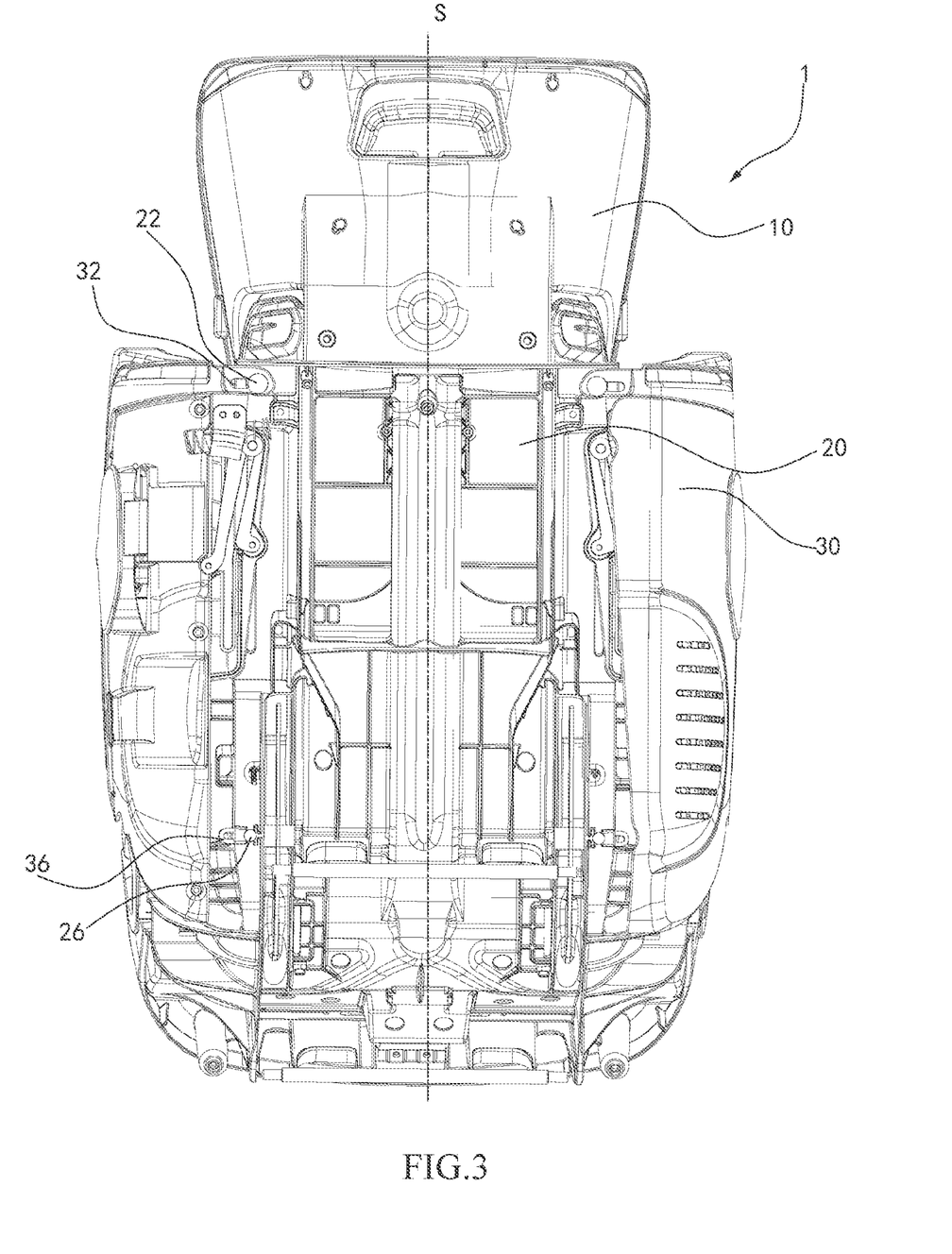
FIG. 3 is a schematic view showing the rear side of the structure of the child safety seat according to the application, wherein the headrest is in a raised state, and the side wings are in an extended state.

As mentioned above, in order to meet the comfort and safety requirements of users of different sizes and the requirements for the pre-factory test of the child safety seat, according to the application, the side wings 30 of the child safety seat 1 can be folded and opened at will as required. Specifically, please refer to FIGS. 2 and 3. FIG. 2 is a schematic view showing a rear side of the structure of the child safety seat according to the application, wherein the headrest 10 is in a non-raised state, and the side wings 30 are in an un-extended state. At this time, a volume of the child safety seat 1 is the smallest. Moreover, FIG. 3 is a schematic view showing the rear side of the structure of the child safety seat according to the application, wherein the headrest 10 is in a raised state. As the headrest 10 is raised, the side wings 30 are correspondingly in the extended state, and at this time, the volume of the child safety seat 1 is the largest. Furthermore, upper sliders 22 are arranged above the rear side of the backrest 20, as shown in FIGS. 2 and 3. The upper sliders 22 are arranged left and right symmetrically in respect to a longitudinal center axis S of the backrest 20. Correspondingly, upper sliding grooves 32 are arranged on an upper side of each of the side wings 30 at positions corresponding to the upper sliders 22, and the upper sliding grooves 32 are also preferably arranged left and right symmetrically in respect to the longitudinal center axis S of the backrest 20. Of course, other arrangements are also possible.

The following description will be given by taking one side of the central axis S as an example. During an extending of the side wings 30 corresponding to a raising of the headrest 10, the upper sliders 22 slide in the upper sliding grooves 32, so as to guide an opening motion of the side wings 30. In the folded state of the side wings 30 shown in FIG. 2, the upper slider 22 is located at leftmost end of the upper sliding grooves 32, and in the opened state of the side wings 30 shown in FIG. 3, the upper slider 22 is located at rightmost end of the upper sliding grooves 32.

In addition, lower sliders 26 are arranged on the backrest 20. In the example shown in FIG. 3, the lower sliders 26 are arranged at positions on a lower side of the backrest 20. Correspondingly, lower sliding grooves 36 are arranged on the side wings 30, and the lower sliders 26 are slidably arranged in the lower sliding grooves 36, such that the side wings 30 can be guided in folding and opening to move more stable. Furthermore, based on the illustrated embodiment, the lower sliders 26 and the lower sliding grooves 36 are provided in two, and both the two lower sliders 26 and the two lower sliding grooves 36 are arranged symmetrically along the longitudinal center axis S of the backrest 20. In the embodiment shown in the drawings, the lower sliders 26 may be arranged in a form of connecting rivets 26, and correspondingly, the lower sliding grooves 36 may be arranged in a form of connecting long grooves, such that the connecting rivets can slide in the connecting long grooves, so as to guide opening and folding movements of the side wings 30. Of course, other forms of the lower sliders and the lower sliding grooves are also possible.

Figure 4:
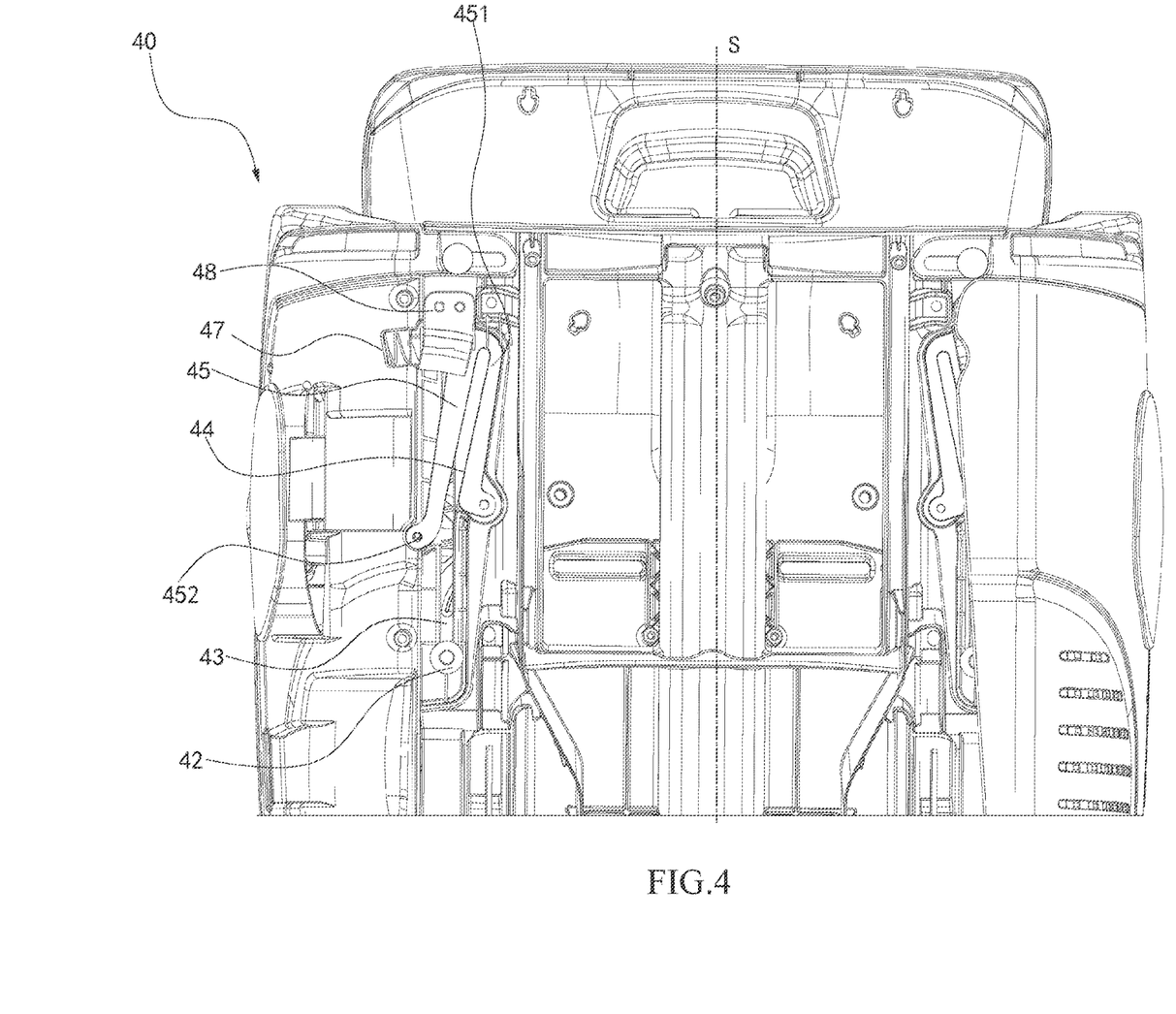
FIGS. 4 and 5 are schematic views showing a specific structure of a side wing adjustment mechanism of the child safety seat according to the application, and different adjustment positions are shown in FIGS. 4 and 5.
Figure 5:
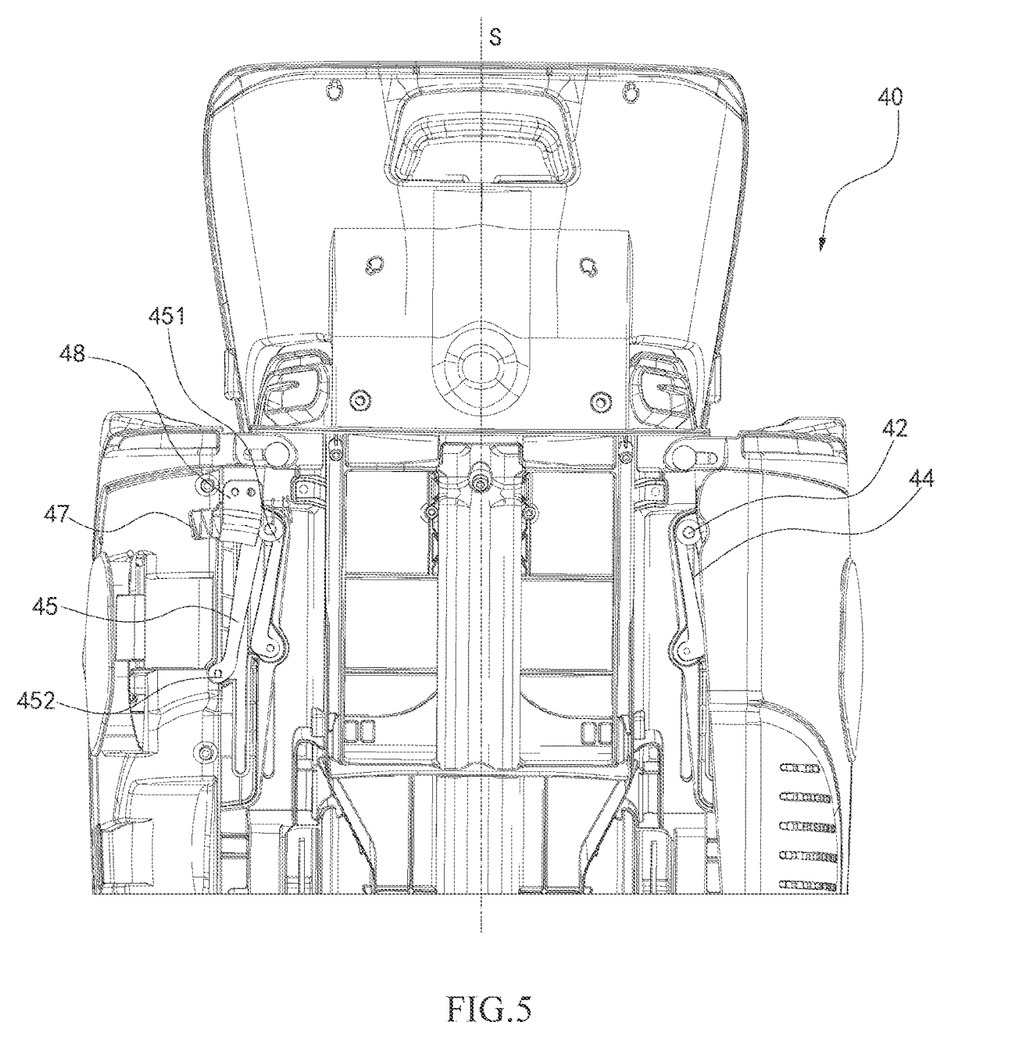

The structure of the side wing adjustment mechanism 40 according to the application will be specifically described herein below with reference to FIGS. 4 and 5, wherein FIGS. 4 and 5 are schematic views showing the specific structure of the side wing adjustment mechanism 40 of the child safety seat 1 according to the application, and different adjustment positions are shown in FIGS. 4 and 5. The side wing adjustment mechanism 40 according to the application mainly includes pins 42 arranged on the headrest 10 and inclined grooves 44 arranged on the side wings 30. In a direction extending from bottom to top toward the headrest 10 along the longitudinal center axis S of the backrest 20, the distance from at least a portion of each of the inclined grooves 44 to the longitudinal center axis S gradually decreases, and the pins 42 can slide up and down along the inclined grooves 44. In the illustrated embodiment, a lower part of the inclined groove 44 is connected to a straight sliding groove 43. The straight sliding groove 43 is in communication with lower part of the inclined groove 44, and upper parts of the inclined groove 44 or the whole inclined groove 44 is arranged inclined relative to the longitudinal center axis S, that is, the closer to the headrest 10 in the direction along the longitudinal center axis S, the smaller the distance of the upper part of the inclined groove 44 from the longitudinal center axis S becomes. Furthermore, in the embodiment shown in the drawings, the number of the pins 42 is provided in two, correspondingly, and the number of the inclined grooves 44 is also provided in two. Both the two pins 42 and the two inclined grooves 44 are symmetrically distributed with respect to the longitudinal center axis S.

Based on the above side wing adjustment mechanism 40, when the headrest 10 is in the folded state, the pins 42 are located at a bottom of the straight sliding grooves 43. When the headrest 10 is pulled upward, the pins 42 connected to the headrest 10 will move upwards together with the headrest 10 at the same time, so as to firstly slide up along the straight sliding grooves 43, and then as the headrest 10 is pulled upward continuously, the pins 42 enter the inclined grooves 44 to slide up continuously. Furthermore, with the upward movement of the pins 42, the inclined grooves 44 are gradually pushed open, such that the side wings 30 are also gradually pushed open. Accordingly, with the upward movement of the headrest 10, the side wings 30 are opened. On the contrary, when the side wings 30 need to be folded, on the one hand, the headrest 10 may be pressed downward, and on the other hand, the side wings 30 may be directly pushed inward. Either a downward movement of the headrest 10 or an inward movement of the side wings 30, the headrest 10 can be pressed onto the backrest 20 while the side wings 30 are also folded by sliding of the pins 42 in the inclined grooves 44.

In order to realize a stable movement of the side wings 30 during opening and folding processes, and prevent the phenomenon of deflection and jamming due to mismatched movements of the side wings 30 on two sides, the side wing adjustment mechanism 40 according to the application further includes a driving rod 49. Referring to FIG. 1, the driving rod 49 is arranged on the front side of the child safety seat 1. In this embodiment, the driving rod is in a U shaped structure as a whole, but the disclosure is not limited to this, and other alternative structures such as an I-shaped cross-bar structure can also be used. The driving rod 49 is connected respectively to the two pins 42 on left and right sides, such that the driving rod 49 can be used to link the movements of the two pins 42. During the upward or downward movement of the headrest 10, the driving rod 49 can link the movements of the two pins 42, such that the movements of the two pins 42 are kept synchronous, which can effectively avoid the phenomenon of deflection and jamming due to mismatched and unbalanced movements of the side wings 30.

In addition, the side wing adjustment mechanism 40 according to the application further includes return members 45. Referring to FIGS. 4 and 5, the return members 45 are arranged on the rear side of the child safety seat 1, and the return members 45 are pivotally connected to the side wings 40. Moreover, as showing in the drawings, each of the return members 45 is in a U shape as a whole. A bottom end of the U shape may be referred to as a first end 451. Each of the pins 42 is received in the first end 451, and can slide in the U shape of a corresponding one of the return members 45. An open end of the U shape may be referred to as a second end 452, and the second end is pivotally connected to a corresponding one of the side wings 30. However, those skilled in the art can understand, the return members 45 are not limited to the U shaped structure shown here, and other alternative structures can be used. With the arrangement of the return members 45, the pins 42 can be guided to slide up and down. Specifically, since the return members 45 are pivotally connected to the side wings 30, and the pins 42 pass through the return members 45, even if there is an error in the size of the inclined grooves 44, for example, the size of the inclined grooves 44 is too large, the movement of the pins 42 can still be guided by the return members 45 in this case, and a smooth sliding of the pins 42 can still be achieved. From this point of view, processing requirements of the inclined grooves 44 can be reduced, and processing cost can be reduced. As shown in FIGS. 4 and 5, the return members 45 are provided in two, and the two return members 45 are symmetrically distributed with respect to the longitudinal center axis S. Of course, other arrangements are also possible. Since the return members 45 are pivotally connected to the side wings 30, when the headrest 10 is pulled upward, the pins 42 enter an interior of the return members 45 while entering the inclined grooves 44. Accordingly, upward sliding of the pins 42 will pull the return members 45 to perform a pivoting motion, and push the side wings 30 away to be in an extended state. On the one hand, when the headrest 10 is pushed downward, the pins 42 slide down along the return members 45 and the inclined grooves 44, and at this time, the return members 45 pivot inwardly, and drive the side wings 30 to be folded by the movement of the pins 42.

In addition, the side wing adjustment mechanism 40 according to the application further includes springs 47. As shown in FIGS. 4 and 5, the spring 47 is provided between the side wings 30 and the return members 45. The arrangement of the springs 47 can ensure that the side wings 30 can be folded without adjusting the headrest 10. Specifically, after the pins 42 return from the inclined grooves 44 to the straight sliding grooves 43, the springs 47 can ensure pulling the side wings 30 to their original position. Or alternatively, the side wings 30 may be pushed also. Under the action of the springs 47, the side wings 30 are pushed to make the pins 42 return from the inclined grooves 44 to the straight sliding grooves 43 in the opposite direction, such that the side wings 30 retract to their original positions. In addition, in order to avoid the springs 47 falling out, the side wing adjustment mechanism 40 according to the application further includes spring positioning members 48, and the spring positioning members 48 are arranged on the side wings 30 for positioning the springs 47.

In the side wing adjustment mechanism 40 and the child safety seat 1 including the side wing adjustment mechanism 40 according to the application, the side wings 30 can be folded and opened at will through the side wing adjustment mechanism 40, and the structure of the application is more inclusive. During the opening and folding process of the side wings 30, puling of the headrest 10 or pushing of the side wings 30 can be performed more smoothly and laborsavingly, and the phenomenon of deflection and jamming of the side wings 30 during the opening and folding process can be avoided, such that the opening and folding process of the side wings 30 is smoother.

Since the features of the disclosure can be embodied in various forms without departing from the characteristics of the disclosure, it should also be understood, the above embodiments are not limited to any details described above, unless otherwise noted; rather, it should be interpreted broadly as being within the scope defined by the appended claims. Therefore, all modifications and variations falling within the scope and limits of the claims or equivalent solutions of such scope and limits shall be covered by the appended claims.

LIST OF REFERENCE SIGNS

1: child safety seat
10: headrest
20: backrest
  22: upper slider  26: lower slider  S: longitudinal center axis
30: side wing
  32: upper sliding groove  36: lower sliding groove
40: side wing adjustment mechanism
  42: pin
  44: inclined groove
  43: straight sliding grooves
  45: return members  451: first end  452: second end
  47: springs
  48: spring positioning members
  49: driving rod
50: seat part

What is claimed is:

1. A side wing adjustment mechanism for adjusting a height of a headrest relative to a backrest and an extension distance of side wings, wherein the side wing adjustment mechanism comprises:
  a pin, arranged on the headrest; and
  a groove, arranged on one of the side wings,
  wherein
  the groove includes
    a first groove portion inclined with respect to a longitudinal center axis of the backrest, and
    a second groove portion extending from the first groove portion and substantially parallel with the longitudinal center axis of the backrest, and
  the pin is slidable along the first groove portion to adjust an extension distance of the one of the side wings and slidable along the second groove portion to adjust the height of the headrest relative to the backrest.

2. The side wing adjustment mechanism according to claim 1, wherein the first groove portion is gradually inclined towards the longitudinal center axis of the backrest in a direction extending from bottom to top toward the headrest along the longitudinal center axis.

3. The side wing adjustment mechanism according to claim 1, wherein the second groove portion is arranged below the first groove portion along the longitudinal center axis.

4. The side wing adjustment mechanism according to claim 1, further comprising a return member, and the return member is pivotally connected to the one of the side wings.

5. The side wing adjustment mechanism according to claim 4, wherein
the return member is in a U shape as a whole,
a bottom end of the U shape is a first end,
the pin is received in the first end and is slidable in the U shape of the return member,
an open end of the U shape is a second end, and
the second end is pivotally connected to the one of the side wings.

6. The side wing adjustment mechanism according to claim 4, further comprising a spring, and the spring is connected between the return member and the one of the side wings.

7. The side wing adjustment mechanism according to claim 6, further comprising a spring positioning member, wherein the spring positioning member is arranged on the one of the side wings for positioning the spring.

8. The side wing adjustment mechanism according to claim 4, further comprising
a further pin arranged on the headrest;
a further groove arranged on another one of the side wings; and
a further return member pivotally connected to the another one of the side wings,
wherein
the pin and the further pin are symmetrically arranged in respect to the longitudinal center axis,
the groove and the further groove are symmetrically arranged in respect to the longitudinal center axis, and
the return member and the further return member are symmetrically arranged in respect to the longitudinal center axis.

9. The side wing adjustment mechanism according to claim 8, further comprising: a driving rod, wherein the driving rod links the pin and the further pin.

10. The side wing adjustment mechanism according to claim 9, wherein the driving rod is in a U shape having two ends respectively connected to the pin and the further pin.

11. An adjustable sitting device, comprising:
a backrest;
a headrest, slidably arranged on the backrest;
side wings, connected to the backrest; and
a side wing adjustment mechanism,
wherein
the side wing adjustment mechanism comprises:
a pin, arranged on the headrest; and
a groove, arranged on one of the side wings,
the groove includes
a first groove portion inclined with respect to a longitudinal center axis of the backrest, and
a second groove portion extending from the first groove portion and substantially parallel with the longitudinal center axis of the backrest, and
the pin is slidable along the first groove portion to adjust an extension distance of the one of the side wings and slidable along the second groove portion to adjust a height of the headrest relative to the backrest.

12. The adjustable sitting device according to claim 11, further comprising:
an upper slider arranged on the backrest; and
an upper sliding groove arranged on one of the side wings,
wherein the upper slider is slidable in the upper sliding groove.

13. The adjustable sitting device according to claim 12, further comprising:
a further upper slider arranged on the backrest; and
a further upper sliding groove arranged on another one of the side wings,
wherein
the upper slider and the further upper slider are symmetrically arranged in respect to the longitudinal center axis of the backrest, and
the upper sliding groove and the further upper sliding groove are symmetrically arranged in respect to the longitudinal center axis of the backrest.

14. The adjustable sitting device according to claim 12, further comprising:
a lower slider is arranged on the backrest; and
a lower sliding groove is arranged on one of the side wings,
wherein the lower slider is slidable in the lower sliding groove.

15. The adjustable sitting device according to claim 11, further comprising:
a lower slider is arranged on the backrest; and
a lower sliding groove is arranged on one of the side wings,
wherein the lower slider is slidable in the lower sliding groove.

16. The adjustable sitting device according to claim 15, further comprising:
a further lower slider is arranged on the backrest; and
a further lower sliding groove is arranged on another one of the side wings,
wherein
the lower slider and the further lower slider are symmetrically arranged in respect to the longitudinal center axis of the backrest, and
the lower sliding groove and the further lower sliding groove are symmetrically arranged in respect to the longitudinal center axis of the backrest.

17. The adjustable sitting device according to claim 16, wherein
each of the lower slider and the further lower slider is in a form of a connecting rivet, and
each of the lower sliding groove and the further lower sliding groove is in a form of a connecting groove.

* * * * *